United States Patent
Orach et al.

(10) Patent No.: US 10,185,693 B2
(45) Date of Patent: Jan. 22, 2019

(54) HIGH SPEED DATA SERIALIZATION THROUGH HERMETIC SEALS

(71) Applicant: Thorlabs, Inc., Newton, NJ (US)

(72) Inventors: Jeffrey Orach, Lakeway, TX (US); Jeffrey Erickson, Cedar Park, TX (US); Shih-Che Huang, Austin, TX (US); Ash Prabala, Austin, TX (US)

(73) Assignee: THORLABS, INC., Newton, NJ (US)

( * ) Notice: Subject to any disclaimer, the term of this patent is extended or adjusted under 35 U.S.C. 154(b) by 209 days.

(21) Appl. No.: 15/093,388

(22) Filed: Apr. 7, 2016

(65) Prior Publication Data

US 2016/0299867 A1    Oct. 13, 2016

Related U.S. Application Data

(60) Provisional application No. 62/145,187, filed on Apr. 9, 2015, provisional application No. 62/146,701, filed on Apr. 13, 2015.

(51) Int. Cl.
*G06F 13/40* (2006.01)
*G06F 13/42* (2006.01)

(52) U.S. Cl.
CPC ...... *G06F 13/4072* (2013.01); *G06F 13/4077* (2013.01); *G06F 13/4086* (2013.01); *G06F 13/4282* (2013.01)

(58) Field of Classification Search
None
See application file for complete search history.

(56) References Cited

U.S. PATENT DOCUMENTS

| 5,613,031 | A | * | 3/1997 | Tanabe | G02B 6/4248 385/138 |
| 5,838,216 | A | | 11/1998 | White et al. | |
| 6,789,959 | B1 | * | 9/2004 | Conn | G02B 6/3897 385/100 |
| 7,083,334 | B2 | * | 8/2006 | Camporeale | G02B 6/3861 385/80 |
| 7,289,852 | B2 | | 10/2007 | Helfinstine et al. | |
| 8,983,302 | B2 | * | 3/2015 | Chan | G02B 6/4246 398/135 |
| 2007/0139080 | A1 | * | 6/2007 | Tang | H03K 19/00361 326/87 |
| 2012/0030400 | A1 | | 2/2012 | Kim et al. | |

(Continued)

FOREIGN PATENT DOCUMENTS

WO    2002025934 A2    3/2002

OTHER PUBLICATIONS

International Search Report with Written Opinion, dated Aug. 18, 2016, for corresponding international application PCT/US2016/026464.

(Continued)

*Primary Examiner* — Michael Sun
(74) *Attorney, Agent, or Firm* — Myers Wolin, LLC

(57) ABSTRACT

A method for transmitting data between the inside and outside of a hermetically sealed chamber, including: serializing first data into a first serial data for transmission; transmitting the first serial data at a first frequency using a first transmission line that connects the inside and outside of the hermetically sealed chamber; wherein the first transmission line is coupled to a first ground.

10 Claims, 1 Drawing Sheet

(56) References Cited

U.S. PATENT DOCUMENTS

2014/0070846 A1* 3/2014 Zou .................. G01R 31/31924
                                                                     326/82
2017/0019186 A1* 1/2017 Wiley .................. H04B 10/801

OTHER PUBLICATIONS

Supplementary European Search Report dated Jul. 31, 2018 including the European search opinion issued by the European Patent Office for corresponding European Patent Application No. EP 16 77 7285.4.

* cited by examiner

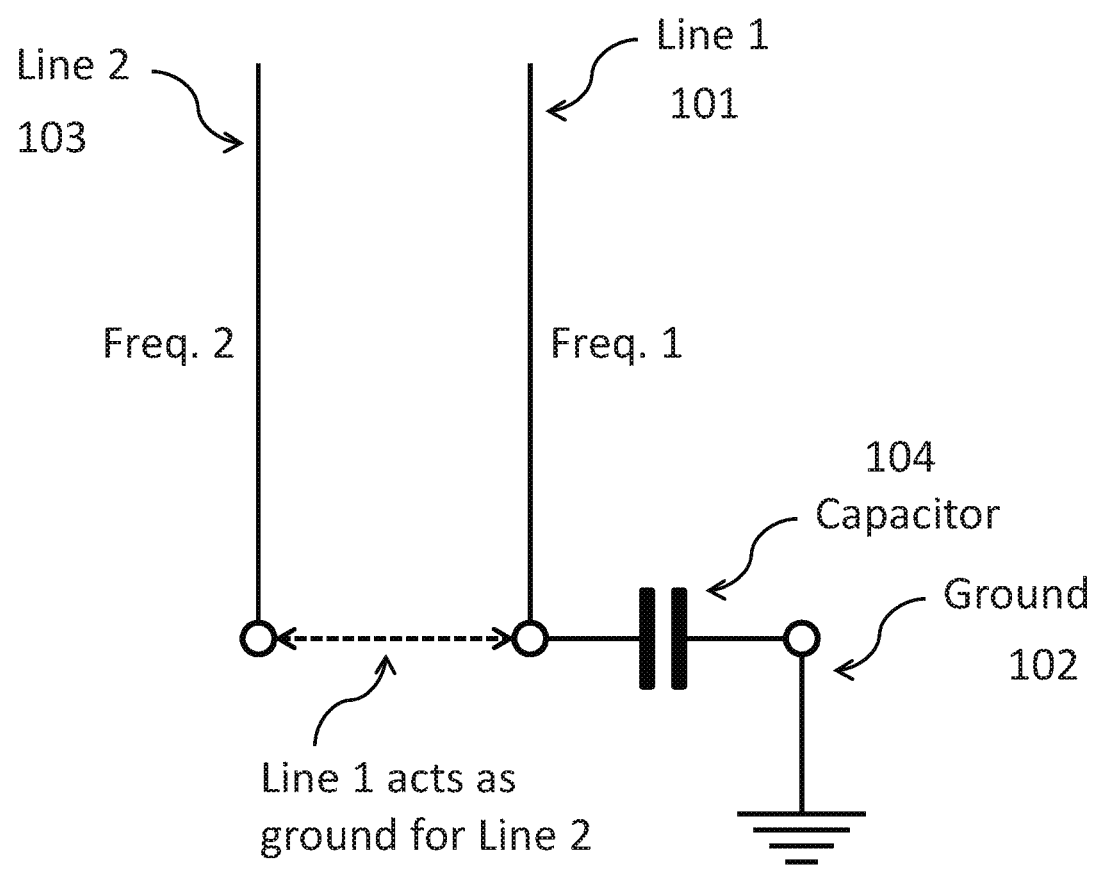

HIGH SPEED DATA SERIALIZATION THROUGH HERMETIC SEALS

CROSS-REFERENCE TO RELATED APPLICATIONS

This application claims the benefit of U.S. Provisional Patent Application No. 62/145,187 filed on Apr. 9, 2015, and U.S. Provisional Patent Application No. 62/146,701 filed on Apr. 13, 2015. The disclosures of U.S. Provisional Patent Application 62/145,187 and U.S. Provisional Patent Application No. 62/146,701 are hereby incorporated by reference.

FIELD OF THE INVENTION

The invention generally relates to data serialization. More particularly, the invention relates to a method and an implementation of high speed data serialization for communication between the inside and outside of a hermetically sealed chamber.

BACKGROUND

In many data communication applications, for example, imaging using a Scientific CMOS (sCMOS) camera, there exists a with a costly design challenge of how to transmit image data from the sensor inside the chamber to the outside world for acquisition. Many such sensors have hundreds of pins necessary to power the sensor and acquire image data. Although communication with the sensor could be made using all the pins, it would have presented a manufacturing cost that far exceeded any reasonable targets for the design. Data serialization is often used to reduce pin count in board layouts, but often requires strict impedance control.

Therefore, there is a need to provide a solution to implement such serialization between two PCBs (printed circuit boards) on either side of the chamber wall, without the above mentioned disadvantages.

SUMMARY

One embodiment of the invention provides a method for transmitting data between the inside and outside of a hermetically sealed chamber, including: serializing first data into a first serial data for transmission; transmitting the first serial data at a first frequency using a first transmission line that connects the inside and outside of the hermetically sealed chamber; wherein the first transmission line is coupled to a first ground.

In another embodiment, the above method further includes: serializing second data into a second serial data for transmission; and transmitting the second serial data at a second frequency using a second transmission line that connects the inside and outside of the hermetically sealed chamber; wherein the second frequency is greater than the first frequency; and wherein the second transmission line is coupled to the first transmission line, with the first transmission line acting as a second ground for the second transmission line.

One embodiment of the invention provides an apparatus for transmitting data between the inside and outside of a hermetically sealed chamber, including: a processor configured to serialize first data into a first serial data for transmission; and a transmitter configured to transmit the first serial data at a first frequency using a first transmission line that connects the inside and outside of the hermetically sealed chamber; wherein the first transmission line is coupled to a first ground.

In another embodiment, in the above apparatus, wherein the processor is further configured to serialize second data into a second serial data for transmission; wherein the transmitter is further configured to transmit the second serial data at a second frequency using a second transmission line that connects the inside and outside of the hermetically sealed chamber; wherein the second frequency greater than the first frequency; and wherein the second transmission line is coupled to the first transmission line, with the first transmission line acting as a second ground for the second transmission line.

BRIEF DESCRIPTION OF THE DRAWINGS

FIG. 1 illustrates a grounding scheme in accordance with an embodiment.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Feeding electrical connections through hermetically sealed chambers is costly, as each pin adds an incremental cost to the production of the chamber. Additionally, each pin adds an extra noise and thermal leakage path to the chamber. So, reduction of pin count is generally desirable.

To reduce pin count in a scientific CMOS camera design, one can serialize the data. The class of sensors targeted for use have pin counts in the hundreds. While a first principles design would have connected such sensors by simply routing all of the pins out of the chamber, it is estimated that the cost were excessive for a reasonable design target. By combining several parallel data pins into pairs of differentially signaled pins communicating serially it is possible to reduce the pin count. This serializer-deserializer (SERDES) link is a technology provided by many FPGA (field-programmable gate array) vendors, and is used in many common high speed interfaces such as PCIe. Such interfaces operate with bit rates well into the gigahertz range.

A major problem in maintaining performance in such high speed interfaces is to position these high speed serial pins close to ground reference pins to preserve signal integrity. This is necessary to maintain proper impedance control so signal integrity is maintained at these high frequencies. In printed circuit board applications, many techniques are used to estimate the transmission line impedance of the connection. Key in these designs is a stable ground plane at a known distance from the transmission line.

In one design, it could have used excess ground pins to provide the grounds to couple the high speed transmission lines and help maintain the impedance. However, pin count can be further reduced by using lines that communicate at far slower rates (several orders of magnitude slower) as grounds. Since the difference in frequency is so large, appropriately selected capacitors are used to couple these slow transmission lines to ground.

Using the principle that frequency dependent impedances are evaluated at the frequency of interest, in one embodiment, a grounding scheme is enhanced by connecting slow data pins to ground via capacitors selected to be very low impedance at the frequency of interest. Doing so means that it is able to communicate across the fast data pins as well as slowly signaled data pins because each end of the pin is presented with a low impedance connection to ground through these capacitors. This means that the high speed transmission lines see the low speed transmission lines as grounds due to the low impedance of the capacitors at this high frequency of interest, but the capacitance is sufficiently small that the low speed transmission lines do not suffer the roll off and other associated losses to signal integrity normally expected with a capacitive load.

Implementation of the Principles

Parallel data is delivered synchronously from an image sensor to a serializing device, for example, an FPGA. That device serializes the data for transmission. The transmitter is an LVDS (low-voltage differential signaling) driver operating at several gigabits per second. The LVDS transmission line leaving the serializing device is a pair of impedance controlled PCB traces. Those traces lead to holes in the PCB that receive conductive pins that are part of a hermetic feed through connector. The other end of the hermetic feed through is inserted into holes in a flexible circuit. The flex circuit has impedance controlled traces leading to a set of metalized fingers. These fingers mate to a connector mounted to a PCB. The connector provides electrical continuity from the flex circuit to a set of impedance controlled traces on this second PCB. These traces lead to the deserializing receivers of another FPGA.

There are notably 4 locations where impedance control is lost: the solder joint between the serializing PCB and the hermetic feedthrough, throughout the hermetic feedthrough, the solder joint between the hermetic feedthrough and the flex circuit, and the contact between the flex circuit and the connector on the deserializing board. In accordance with one embodiment, a scheme for pin assignment in the connector preserves enough of the impedance control to make multi-gigahertz signaling possible.

By serializing this data connection, it can reduce manufacturing cost, improve hermetic reliability, and minimize thermal and noise injection into the sensor. This results in a lower cost, more reliable, better performing product than one employing a fully parallel connector scheme.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for transmitting data between the inside and outside of a hermetically sealed chamber, comprising:
    serializing first data into a first serial data for transmission;
    transmitting the first serial data at a first frequency using a first transmission line that connects the inside and outside of the hermetically sealed chamber;
    serializing second data into a second serial data for transmission; and
    transmitting the second serial data at a second frequency using a second transmission line that connects the inside and outside of the hermetically sealed chamber;
    wherein the second frequency is greater than the first frequency;
    wherein the first transmission line is coupled to a first ground; and
    wherein the second transmission line is coupled to the first transmission line, with the first transmission line acting as a second ground for the second transmission line.

2. The method of claim 1, wherein the first transmission line is coupled to the first ground via a capacitor, and wherein the capacitor has a capacitance selected to maintain signal integrity for the transmission of the first serial data at the first frequency.

3. The method of claim 1, wherein the second frequency is multiple orders of magnitudes greater than the first frequency.

4. The method of claim 1, wherein the serialization is performed by a FPGA (field-programmable gate array).

5. The method of claim 1, wherein the transmission is performed by an LVDS (low-voltage differential signaling) driver.

6. An apparatus for transmitting data between the inside and outside of a hermetically sealed chamber, comprising:
    a processor configured to serialize first data into a first serial data for transmission; and
    a transmitter configured to transmit the first serial data at a first frequency using a first transmission line that connects the inside and outside of the hermetically sealed chamber;
    wherein the processor is further configured to serialize second data into a second serial data for transmission;

wherein the transmitter is further configured to transmit the second serial data at a second frequency using a second transmission line that connects the inside and outside of the hermetically sealed chamber;

wherein the second frequency greater than the first frequency;

wherein the first transmission line is coupled to a first ground and wherein the second transmission line is coupled to the first transmission line, with the first transmission line acting as a second ground for the second transmission line.

7. The apparatus of claim 6, wherein the first transmission line is coupled to the first ground via a capacitor, and wherein the capacitor has a capacitance selected to maintain signal integrity for the transmission of the first serial data at the first frequency.

8. The apparatus of claim 6, wherein the second frequency is multiple orders of magnitudes greater than the first frequency.

9. The apparatus of claim 6, wherein the processor comprises a FPGA (field-programmable gate array).

10. The apparatus of claim 6, wherein the transmitter comprises an LVDS (low-voltage differential signaling) driver.

* * * * *